United States Patent [19]

Schulz

[11] 4,014,298
[45] Mar. 29, 1977

[54] CONCENTRIC ROTARY ENGINE

[76] Inventor: John E. Schulz, 10707 Moorpark, Apt. 204, North Hollywood, Calif. 91602

[22] Filed: Mar. 17, 1975

[21] Appl. No.: 558,845

Related U.S. Application Data

[63] Continuation-in-part of Ser. No. 505,062, Sept. 11, 1974, Pat. No. 3,921,596.

[52] U.S. Cl. .............................. 123/8.27; 123/8.45
[51] Int. Cl.² .......................................... F02B 53/00
[58] Field of Search ............... 123/8.19, 8.27, 8.33; 418/186, 187

[56] References Cited

UNITED STATES PATENTS

| | | | |
|---|---|---|---|
| 2,214,833 | 9/1940 | Hocker | 123/8.19 |
| 2,353,446 | 7/1944 | Davidson | 123/8.19 |
| 2,920,814 | 1/1960 | Breelle | 123/8.27 |
| 3,244,157 | 4/1966 | Tanferna et al. | 418/186 X |
| 3,539,280 | 11/1970 | Ravera | 123/8.45 X |
| 3,894,519 | 7/1975 | Moran | 123/8.45 |

FOREIGN PATENTS OR APPLICATIONS

| | | | |
|---|---|---|---|
| 93,122 | 6/1923 | Austria | 123/8.31 |
| 106,385 | 5/1927 | Austria | 123/8.27 |
| 386,356 | 12/1923 | Germany | 123/8.27 |

Primary Examiner—Carlton R. Croyle
Assistant Examiner—Michael Koczo, Jr.
Attorney, Agent, or Firm—Donald Diamond

[57] ABSTRACT

A concentric rotary engine of the internal combustion type is provided which includes a rotor concentrically disposed within a hollow rotor housing. The rotor, which has a perimetrical cam surface defining lobe portions separated by pocket portions, is in slidable, sealable and rotatable engagement with the inner surface of the rotor housing. A power transfer shaft is secured to the rotor and extends beyond the housing. The engine is provided with one or more operative sections each of which includes a leading gate system, a trailing gate system and a combustion chamber disposed therebetween. The operative section, in cyclical sequence, cooperates with the rotor lobe and pocket portions together with intake and exhaust passage systems to effect the engine cycle in respect of the intake, compression, combustion, expansion and exhaust steps.

30 Claims, 23 Drawing Figures

U.S. Patent  Mar. 29, 1977  Sheet 1 of 3  4,014,298
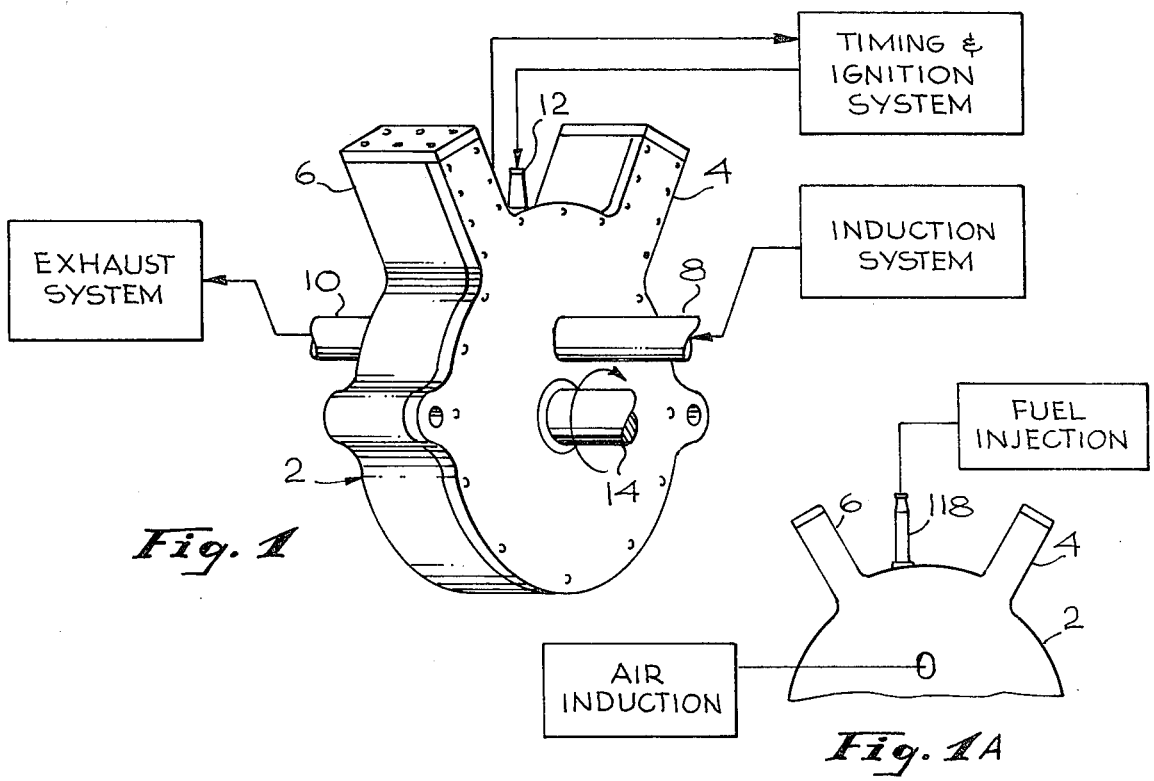
Fig. 1
Fig. 1A
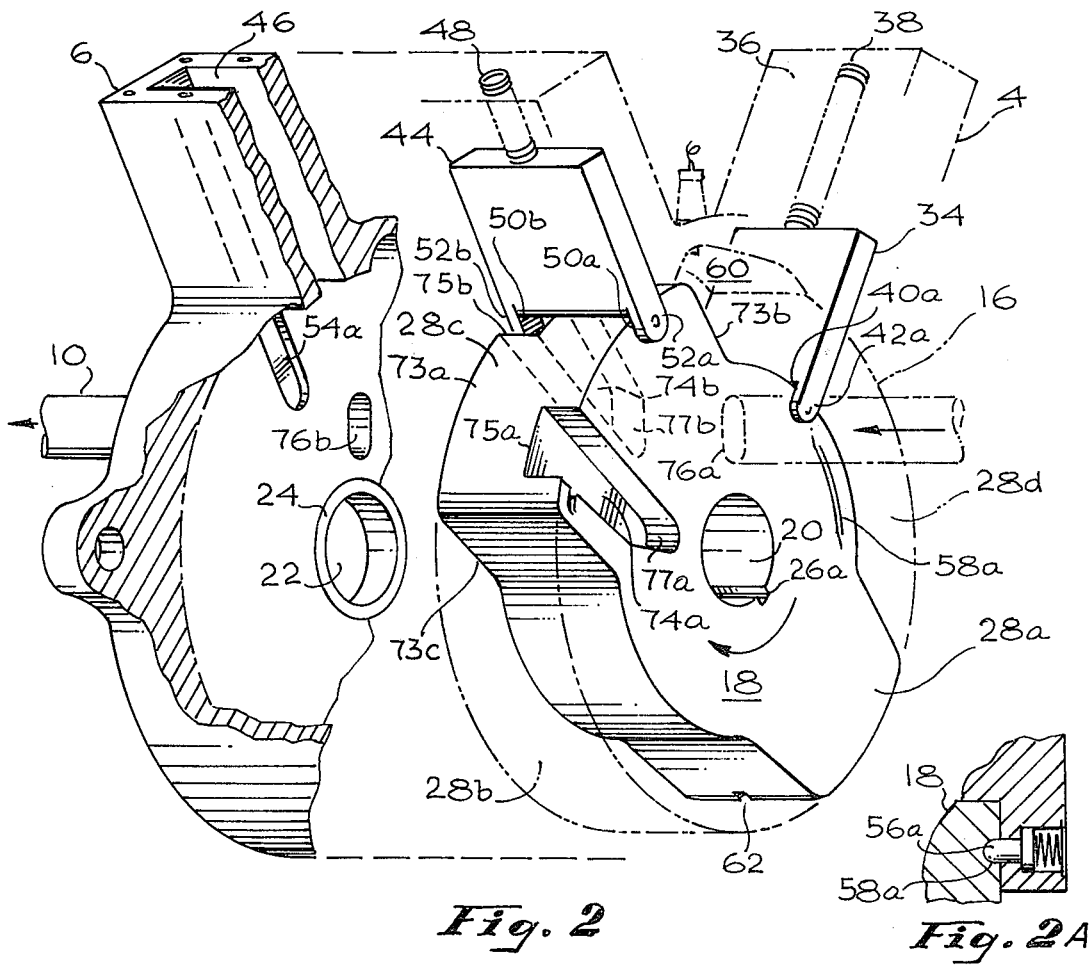
Fig. 2
Fig. 2A

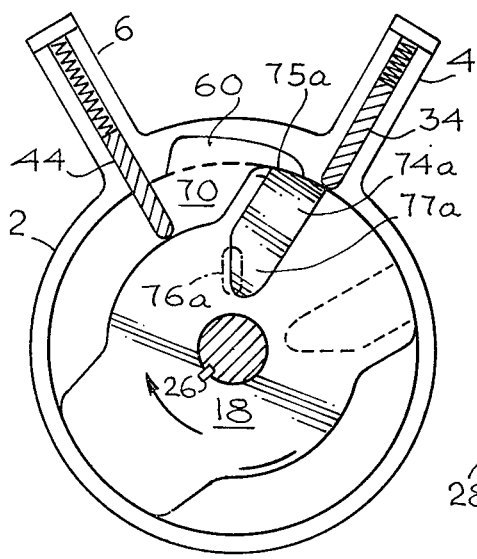
Fig. 3
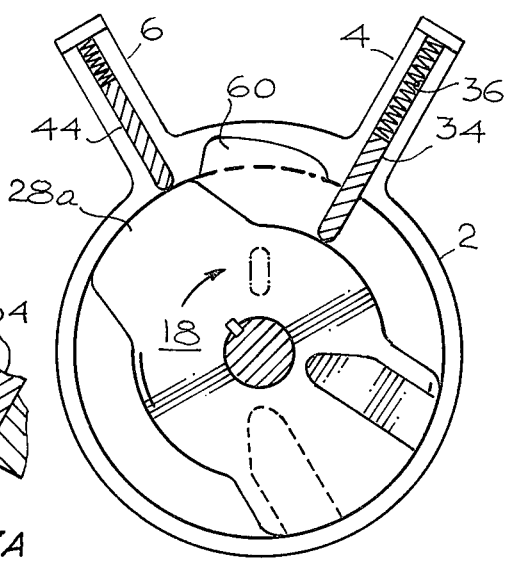
Fig. 4
Fig. 5A
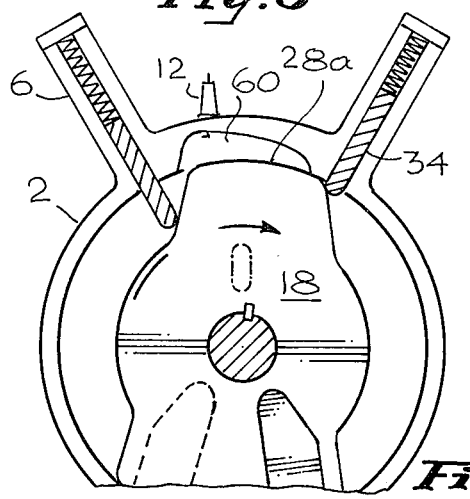
Fig. 5
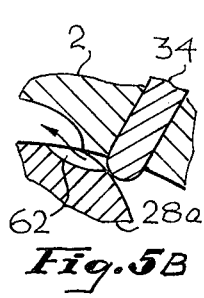
Fig. 5B
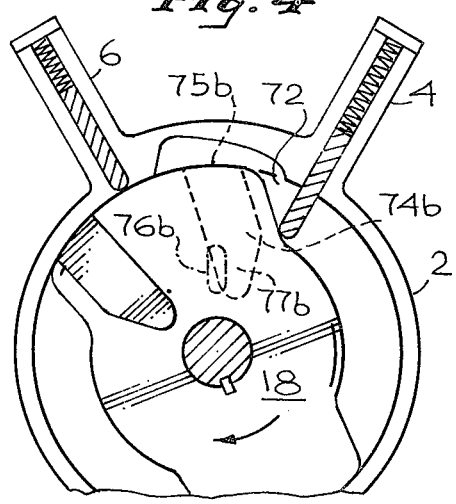
Fig. 6
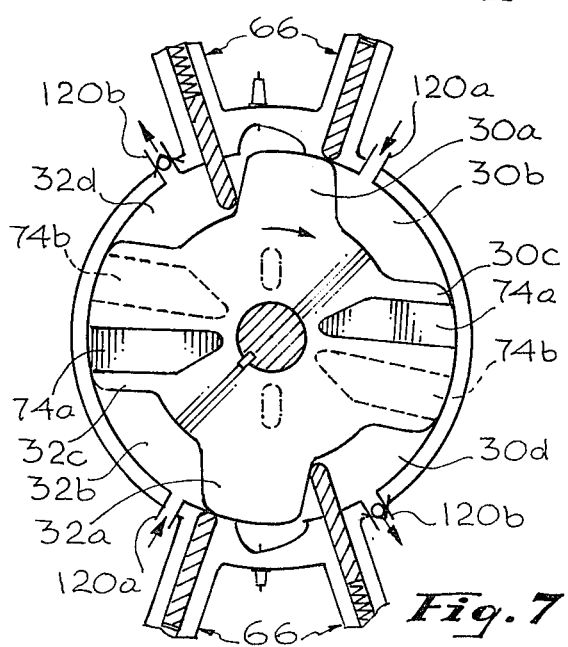
Fig. 7
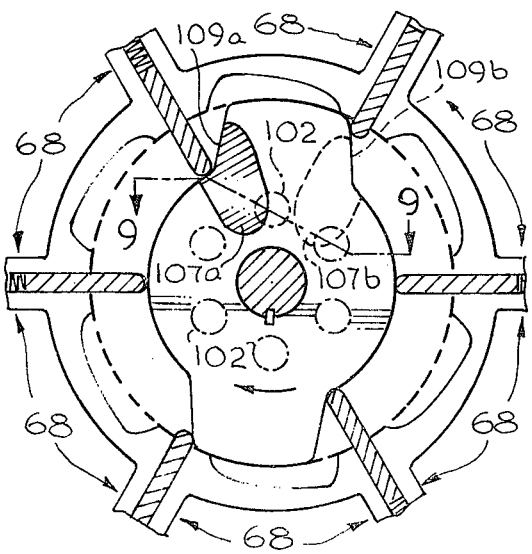
Fig. 8

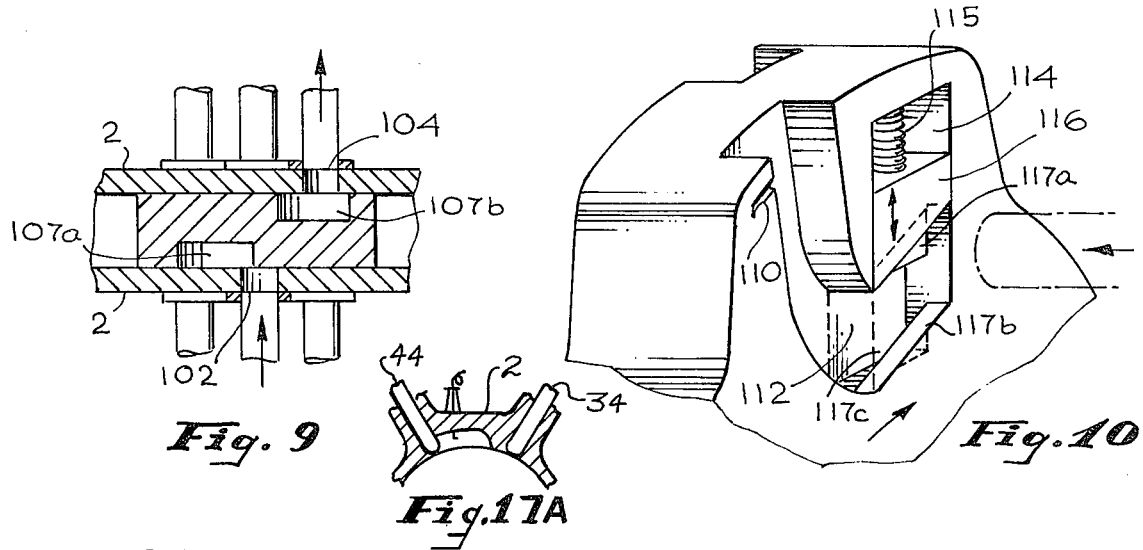
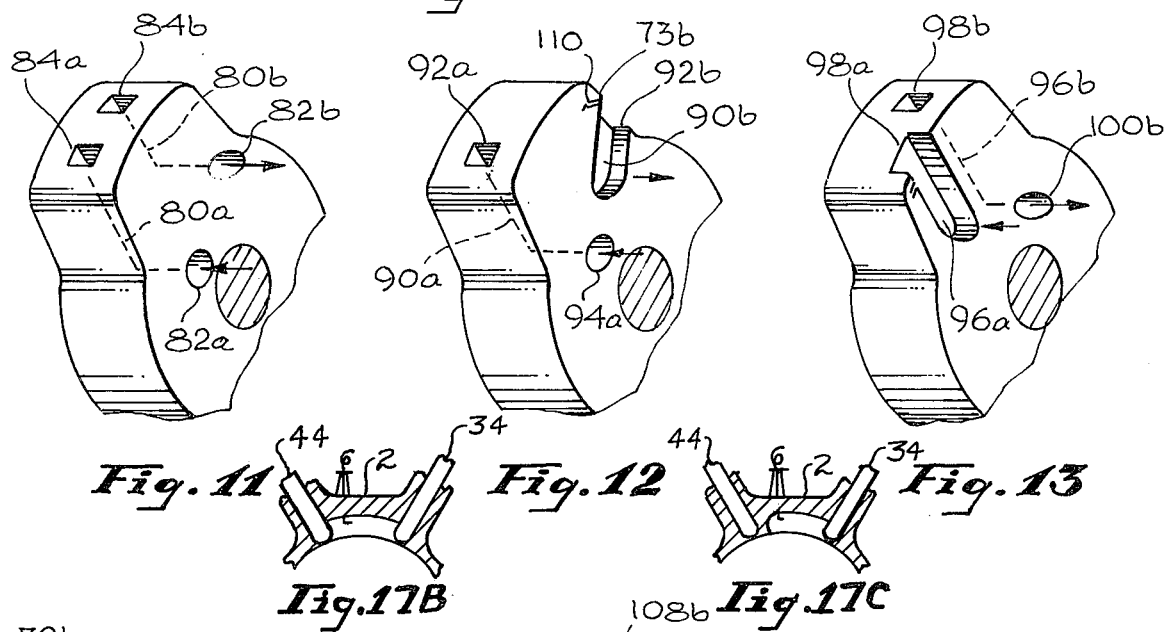
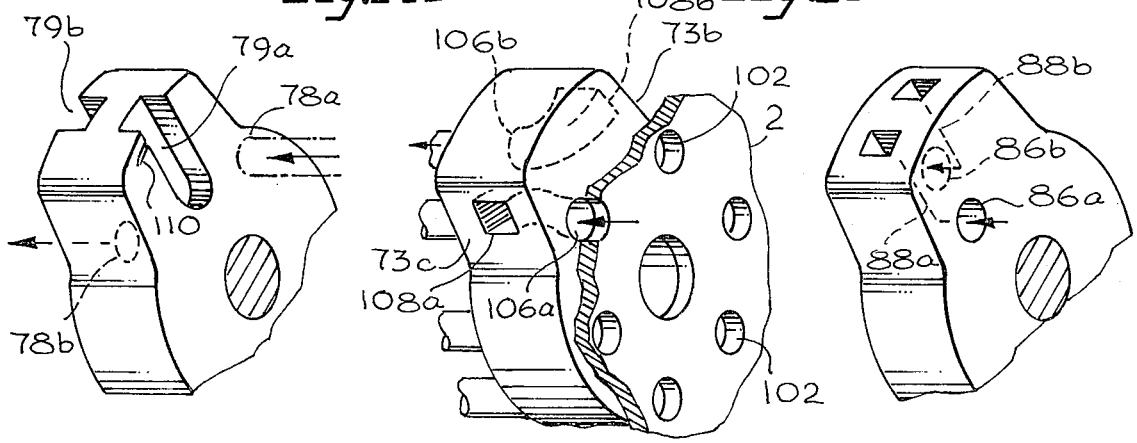

CONCENTRIC ROTARY ENGINE

CROSS-REFERENCE TO RELATED APPLICATION

This application is a continuation-in-part of U.S. Patent Application Ser. No. 505,062 filed on Sept. 11, 1974 and entitled Concentric Rotary Engine, now U.S. Pat. No. 3,921,596.

FIELD OF THE INVENTION

This invention relates to rotary engines and, more particularly, to concentric rotary engines of the internal combustion type.

The invention is characterized by unique simplicity and compactness and provides novel and efficient means for feeding and compressing intake fluids and exhausting spent gases.

OBJECTS

An object of this invention is to provide an improved rotary engine having a rotor of novel design concentrically disposed within a cylindrical housing therefor.

Another object of this invention is to provide a rotary engine of the character described wherein the rotor has a perimetrical cam configuration defining lobe portions separated by pocket portions.

A further object of this invention is to provide a rotary engine with one or more operative sections each of which includes a leading gate system, a trailing gate system and a combustion chamber therebetween.

A still further object of this invention is to provide a rotary engine of the character described which includes unique and simplified intake and exhaust passage systems.

Yet another object of this invention is to provide a rotary engine of the character described wherein the operative section, in cyclical sequence, cooperates with the rotor lobe and pocket portions together with the intake and exhaust passage systems to effect the engine cycle.

SUMMARY OF THE INVENTION

In accordance with this invention, there is provided a concentric rotary engine of the internal combustion type which includes a rotor housing having an inner surface which defines a hollow, cylindrical chamber. A rotor is concentrically disposed within the chamber and is adapted to rotatably engage the inner surface of the housing. A power transfer shaft is secured to the rotor and extends beyond the housing.

The rotor has a perimetrical cam surface comprising lobe portions separated by pocket portions. In the direction of axial rotation, these sequentially disposed lobe and pocket portions define a power lobe, an inlet pocket, an operating lobe and a combustion pocket. The operating lobe and the power lobe comprise a cooperating lobe assembly and the rotor may be provided with one or more of these assemblies with the lobes thereof being separated by appropriate pocket portions.

The rotary engine is provided with correlatively spaced, leading and trailing gate systems which include, respectively, leading and trailing gates and leading and trailing gate housings therefor. The gate housings are integrated with the rotor housing and are in open mouth communication with the transverse width of the rotor cam surface. The gates are yieldably, sealingly and slidably disposed within their respective housings for sealingly and slidably engaging the transverse width of the rotor cam surface.

A combustion chamber is recessed in the inner surface of the rotor housing between the leading and trailing gates.

An operative section is defined by the leading and trailing gate systems and the combustion chamber disposed therebetween. One or more operative sections may be utilized in the engine.

An intake reservoir is defined by the portion of the rotor inlet pocket in cyclic cooperation and communication with an operative section. An expansion receiver is defined by the portion of the rotor combustion pocket in cyclic cooperation and communication with an operative section.

The rotary engine is provided with intake passage means for conveying fluid to the intake reservoir and is provided with exhaust passage means for withdrawing fluid from the expansion receiver. The intake and exhaust passage means are disposed in spaced relationship to provide sequential and substantially mutually exclusive fluid flow systems in respect of the combustion cycle. The intake passage means include intake port means in the rotor housing and entrance conduit means in the rotor for extending fluid communication from the intake port means to the intake reservoir means. The exhaust passage means includes exhaust port means in the rotor housing and exit conduit means in the rotor for extending fluid communication from the expansion receiver means to the exhaust port means.

Means are provided for withdrawing fluid compressibly entrapped between the power lobe and the leading gate when the leading gate is in spaced relationship to the combustion chamber; and means are provided for initiating combustion of combustible fluid in the combustion chamber.

The rotor housing may advantageously be provided with first and second, correlative, external conduits for admitting fluid into the housing and discharging compressed fluid therefrom, with the conduits being disposed in the non-combustion portion of the housing between the leading and trailing gates.

The orifice portions of the entrance and exit conduit means which are adapted to communicate with the intake and exhaust port means, respectively, may, advantageously, be in spaced, overlapping alignment with at least one of the orifice portions being provided with speed responsive, variable closure means for selectively varying the flow-through dimension of such orifice portion and for selectively varying the alignment of such orifice portion with respect to the other orifice portion.

In operation, the advancing face of the power lobe means cooperates with the combustion chamber and the leading gate for defining a fuel compression space and the rearward face of the power lobe means cooperates with combustion chamber and the trailing gate for defining a combustion products expansion space.

DESCRIPTION OF THE DRAWINGS

FIG. 1 is a perspective view of an encased rotary engine embodying the features of the present invention.

FIG. 1A is a schematic, fragmentary view of the rotary engine illustrating fuel injection means for admitting fuel directly into the combustion chamber while air is admitted to the combustion chamber through the intake passage system.

FIG. 2 is an enlarged perspective view of the rotary engine with the housing in phantom lines and including a fragmentary view of the gate housing and the inner surface of the rotor housing side wall.

FIG. 2A is a fragmentary, sectional view through the lower end of the trailing gate and the rotor showing the yieldable pin and groove combination for releasably securing this gate to the rotor during combustion.

FIGS. 3, 4, 5 and 6 schematically illustrate the positions of the lobes, conduits, and gates during the intake, compression, combustion and exhaust phases of the engine cycle.

FIGS. 5A and 5B are fragmentary, sectional views through an operative section showing alternative conduit means for withdrawing fluid compressibly entrapped between the power lobe and the leading gate when the latter is in spaced relationship to the combustion chamber.

FIG. 7 schematically illustrates a rotary engine having multiple power and operating lobes and multiple, spaced operative sections together with ingress and egress conduits for providing compressed fluid.

FIG. 8 schematically illustrates a rotary engine having multiple operative sections in abutting relationship and intake and exhaust port means for each operative section.

FIG. 9 is a transverse section along line 9—9 of FIG. 8.

FIG. 10 is a fragmentary, perspective view of an operating lobe showing the intake orifice of an intake conduit provided with speed responsive, variable closure means.

FIGS. 11-16 are fragmentary, perspective views of the rotor illustrating alternative positioning of the intake and exhaust passage means to provide sequential and substantially mutually exclusive fluid flow systems.

FIGS. 17a, 17b and 17c are schematic, fragmentary, sectional views through an operative section showing various spacing relationships of the leading and trailing gates with respect to the combustion chamber. In FIG. 17a, the leading gate is spaced and the trailing gate is abutting; in FIG. 17b, the leading and trailing gates abut the combustion chamber; and in FIG. 17c, the leading gate is abutting while the trailing gate is spaced.

DETAILED DESCRIPTION

Referring to the drawings and, in particular, to FIG. 1, there is shown a rotary engine having a rotor housing 2, a leading gate housing 4, a trailing gate housing 6, a feed conduit 8, a discharge conduit 10, a spark plug 12 and a power shaft 14. The gate and rotor housings are adapted to be disassembled to provide access to the interior thereof.

The inner surface 16 of the rotor housing, as shown in FIG. 2, defines a hollow, cylindrical chamber. A rotor 18 is concentrically disposed within the chamber. The rotor is provided with a concentric, transverse opening 20. The opposite ends of the transverse opening are in alignment with corresponding orifices 22 in the opposite side walls of the rotor housing, with the orifices being defined by suitable bearing members 24. The power shaft 14 is disposed within the transverse opening and extends through the orifices of the bearing members beyond the housing. This shaft, which is rotatably disposed within the bearing orifices, is secured to the rotor by suitable locking means. In an exemplary embodiment, the shaft is provided with a longitudinal tongue 26 for lockingly engaging a corresponding longitudinal groove 26a recessed in the rotor along the transverse opening (FIG. 3), or a key-way assembly comprising oppositely disposed and longitudinally aligned slots in the shaft and rotor interlocked by a latching member may be so employed.

The perimetrical surface of the rotor has a cam configuration defining lobe portions separated by pocket portions. The rotor is in slidable, sealable and rotatable engagement with the inner surfaces of the rotor housing except of the pocket portions thereof which are in spaced relationship to the inner surface of the housing. The lobe portions of the rotor comprise power lobe means and operating lobe means and the pocket portions of the rotor comprise inlet pocket means and combustion pocket means. With reference to FIG. 2, the cam configuration defines, in the direction of axial rotation, a power lobe 28a, an inlet pocket 28b, an operating lobe 28c and a combustion pocket 28d. A multiple power lobe/operating lobe configuration is shown in FIG. 7 which includes first and second power lobes 30a, 32a, first and second inlet pockets 30b, 32b, first and second operating lobes 30c, 32c and first and second combustion pockets 30d, 32d. Thus, in one aspect, the lobe portions comprise a single power lobe and a single operating lobe, with appropriate pocket portions; and, in a second aspect, the lobe portions comprise multiple power lobes with a corresponding number of operating lobes and appropriate pocket portions.

The rotary engine is provided with one or more operative sections. Each operative section includes a leading gate system, a trailing gate system and a combustion chamber disposed therebetween, with the leading and trailing gate systems being in correlative spaced relationship.

Referring to FIG. 2, there is shown a rotary engine having one operative section. The leading gate system of this operative section includes a leading gate 34 and a leading gate housing therefor 4. The leading gate housing, which is integrated with the rotor housing 2, defines a leading gate aperture 36 which is in open mouth communication with the transverse width of the rotor cam surface. The leading gate is yieldably, sealingly and slidably disposed within the leading gate aperture for sealingly and slidably engaging the transverse width of the rotor cam surface. A yieldable expansion spring 38 is interposed and suitably retained between the top wall of the leading gate and the upper wall of the leading gate housing for yieldably biasing the leading gate against the rotor cam surface.

The opposite side walls of the leading gate, as illustrated by 40a, extend laterally beyond the side walls of the rotor and are provided with rotor directed, extending flanges, as illustrated by 42a, which overlie a portion of the oppositely disposed, rotor side walls and slidably and sealingly engage the same; and the side walls of the rotor housing are provided with mating slots, not shown, for sealingly and slidably receiving the flanges as a function of the cam configuration of the rotor's perimetrical surface.

The trailing gate system of the operative section shown in FIG. 2 includes a trailing gate 44 and a trailing gate housing therefor 6. The trailing gate housing is integrated with the rotor housing 2 and defines a trailing gate aperture 46 which is in open mouth communication with the transverse width of the rotor cam surface. The trailing gate is yieldably, sealingly and slidably disposed within the trailing gate aperture for sealingly and slidably engaging the transverse width of the rotor cam surface. A yieldable expansion spring 48 is interposed between the top wall of the trailing gate and the upper wall of the trailing gate housing for yieldably biasing the trailing gate against the rotor cam surface.

The opposite side walls of the trailing gate 50a, 50b extend laterally beyond the side walls of the rotor and are provided with rotor directed, extending flanges 52a, 52b which overlie a portion of the oppositely disposed, rotor side walls and slidably and sealingly engage the same. The side walls of the rotor housing are provided with mating slots, as illustrated by 54a, for sealingly and slidably receiving the flanges as a function of the cam configuration of the rotor's perimetrical surface.

Releasable locking means are provided for radially securing the trailing gate to the rotor during combustion while not impeding axial rotation of the rotor. For this purpose, spring biased pins, as illustrated by 56a in FIG. 2A, are yieldably disposed in the opposite flanges of the trailing gate for slidably engaging the side walls of the rotor. Releasable locking grooves having cam surfaces at the leading and trailing ends thereof are disposed in the opposite rotor side walls rearwardly adjacent to the trailing face of the power lobe so as to slidably and lockingly engage the pins during combustion. An exemplary locking groove is illustrated at 58a in FIG. 2. Similar releasable locking means can be provided for radially securing the leading gate to the rotor during compression.

A combustion chamber 60 is recessed in the inner surface of the rotor housing between the leading and trailing gates. The leading and trailing gates may be in abutting or spaced relationship to the combustion chamber as shown in FIG. 5 and FIGS. 17a through 17c. However, when the leading gate is spaced from the combustion chamber, then means are provided for removing fluid entrapped anteriorly of the combustion chamber between the advancing face of the power lobe and the leading gate. In a first embodiment, the entrapped fluid is conveyed to the combustion chamber. In a second embodiment, the entrapped fluid is returned to the input or feed system. As to the first embodiment, the means for withdrawing the entrapped fluid may take the form of a groove 62 disposed within and bridging the anterior corner of the power lobe as shown in FIGS. 2 and 5B. In an alternative aspect, the means for withdrawing the entrapped fluid may take the form of a conduit 64 disposed within the inner surface of the rotor housing and extending from the leading gate to the combustion chamber as shown in FIG. 5A.

The rotary engine may be provided with a plurality of operative sections. A rotary engine having two operative sections in spaced relationship 66 is schematically illustrated in FIG. 7 while a rotary engine having six operative sections in abutting relationships 68 is schematically shown in FIG. 8. When the operative sections are in abutting relationship, each gate has a dual function in that it is the leading gate for one operative section and, at the same time, the trailing gate for the immediately succeeding operative section.

An intake reservoir 70 is defined by the portion of the rotor inlet pocket in cyclic cooperation and communication with an operative section (FIG. 3). An expansion receiver 72 is defined by the portion of the rotor combustion pocket in cyclic cooperation and communication with an operative section (FIG. 6).

An intake passage system is provided for conveying fluid to the intake reservoir and an exhaust passage system is provided for withdrawing fluid from the expansion receiver. The intake and exhaust passage systems are disposed in spaced relationship to provide sequential and substantially mutually exclusive fluid flow systems.

The intake passage system includes an intake port disposed in the rotor housing within the minimum radius defined by the rotor pockets and an entrance conduit in the operating lobe for extending fluid communication from the intake port to the intake reservoir. The entrance conduit has an intake orifice for communicating with the intake port and a peripheral orifice for communicating with the intake reservoir.

The exhaust passage system includes an exhaust port disposed in the rotor housing within the minimum radius defined by the rotor pockets and an exhaust conduit in the operating lobe for extending fluid communication from the expansion receiver to the exhaust port. The exhaust conduit has an exhaust orifice for communicating with the exhaust port and a peripheral orifice for communicating with the expansion receiver.

With reference to FIG. 2, the operating lobe has an outer perimetrical wall 73a of maximum radius which terminates at its ends in depending anterior and posterior walls 73b, 73c of declining radius. As shown in FIG. 2, the entrance conduit 74a and the exit conduit 74b comprise side wall surface channels disposed in the opposite side walls of the operating lobe in arcuate spaced relationship with their peripheral orifices 75a, 75b being disposed in the outer perimetrical wall of the operating lobe. The intake and exhaust orifices 77a, 77b of these conduits are aligned to communicate with the intake and exhaust ports 76a, 76b, respectively, which are disposed in the opposite side walls of the rotor housing and are shown as being in transverse alignment. Alternatively, as shown in FIG. 14, the entrance conduit 79a and the exit conduit 79b may be side wall surface channels in transverse alignment with the intake and exhaust ports 78a, 78b being in arcuate spaced relationship.

The entrance conduit 80a and exit conduit 80b, as shown in FIG. 11, may be located internally in the operating lobe with their intake and exhaust orifices 82a, 82b being disposed in the same side wall of the rotor at different radius levels and their peripheral orifices 84a, 84b being disposed in the outer perimetrical wall of the operating lobe. Alternatively, as illustrated in FIG. 16, the intake orifice 86a and exhaust orifice 86b, of internally located entrance and exit conduits 88a, 88b, may be disposed in the opposite side walls of the rotor.

As shown in FIG. 12, the exit conduit 90b is a side wall surface channel with its peripheral orifice 92b being disposed in the anterior wall 73b of the operating lobe. The entrance conduit 90a is located internally in the operating lobe with its intake orifice 94a being in the same rotor side wall as the exit conduit but at a mutually exclusive radius level. The peripheral orifice 92a of the entrance conduit is in the perimetrical wall of the operating lobe.

With reference to FIG. 13, the entrance conduit 96a is a side wall surface channel and the exit conduit 96b is located internally in the operating lobe. The peripheral orifices 98a, 98b of the conduits are disposed in the perimetrical wall of the operating lobe. The exhaust orifice 100b is in the same rotor side wall as the entrance conduit but at a mutually exclusive radius level.

Referring to FIGS. 8, 9 and 15, there is shown an intake and exhaust passage system for a rotary engine having a plurality of operative sections in abutting relationship. The intake port 102 and the exhaust port 104 are disposed in the opposite side walls of the rotor housing, in arcuate spaced relationship, for each operative section. As shown in FIG. 15, the entrance conduit 106a and the exit conduit 106b are located internally in the operating lobe with the peripheral orifice 108a of the entrance conduit being disposed in the posterior wall 73c of the operating lobe and the peripheral orifice 108b of the exit conduit being disposed in the anterior wall 73b of the operating lobe. As shown in FIGS. 8 and 9, the entrance conduit 107a and the exit conduit 107b are side wall surface channels disposed in the opposite side walls of the operating lobe with the peripheral orifice 109a of the entrance conduit being disposed in the posterior wall of the operating lobe and the peripheral orifice 109b of the exit conduit being disposed in the anterior wall of the operating lobe. The intake and exhaust orifices of these conduits are suitably aligned to communicate with the intake and exhaust ports, respectively. As shown in FIG. 8, the intake conduit is adapted to concurrently admit fluid into adjoining intake reservoirs.

When the entrance or the exit conduit or both are side wall surface channels, then a locking pin cam groove 110 is provided in the rotor side wall in combination with the trailing end of each such channel to accommodate the trailing gate, spring biased locking pins 56a.

The intake and exit orifices of the intake and exit conduits may, advantageously, be in spaced, overlapping alignment with a least one of the orifices being provided with speed responsive, variable closure means for selectively varying the flow-through dimension of such orifice and for selectively varying the alignment of such orifice with respect to the other orifice.

In an illustrative embodiment, as shown in FIG. 10, the intake orifice 112 is laterally extended into spaced, overlapping alignment with the exhaust orifice. A channel portion 114 is radially continuous with the extended intake orifice. A centrifugally actuated, spring biased 115, slidable closure 116 is slidably and sealingly disposed in the channel portion and is adapted to enter into and recede from the extended orifice and thereby vary the flow-through dimension of this orifice as a function of engine speed.

The rearward portion of the bottom wall of the slidable closure is provided with an angular projection 117a and the forward portion of the bottom wall of the extended intake orifice is inclined 117b to define a rearwardly disposed recessed portion 117c. The angular projection of the closure cooperates with the recessed portion of the intake orifice for selectively varying the alignment of this orifice with respect to the other orifice.

The operation of the rotary engine is schematically shown in FIG. 3 through FIG. 6. In the intake portion of the cycle, as shown in FIG. 3, the intake orifice 77a of the entrance conduit 74a is in communication with the intake port 76a and the peripheral orifice 75a is in communication with the intake reservoir 70. This positioning of components permits a fluid such as air or a fuel-air mixture to pass through the intake passage system to the intake reservoir.

During the compression phase of the cycle, the power lobe 28a displaces the fuel-air mixture from the intake reservoir and compresses the same into the combustion chamber 60 as shown in FIG. 4. However, as the leading face of the power lobe passes the leading wall of the combustion chamber (FIG. 5), a portion of the fuel-air mixture is entrapped in the space defined by the power lobe, the leading gate and the rotor housing. The entrapped fuel-air mixture is conveyed to the combustion chamber by means of a conduit 64 disposed within the inner surface of the rotor housing and extending from the leading gate to the combustion chamber as shown in FIG. 5A or by means of a groove 62 bridging the anterior corner of the power lobe as illustrated in FIG. 5B.

As the leading face of the power lobe passes the leading gate, the compressed air-fuel mixture is ignited by a suitably timed spark plug actuator 12 whereby the rotor and power shaft are propelled in a clockwise direction.

In the exhaust phase of the cycle, as shown in FIG. 6, the exhaust orifice 77b of the exit conduit 74b is in communication with the exhaust port 76b and the peripheral orifice 75b is in communication with the expansion receiver 72. This positioning of components permits spent gases to be discharged from the expansion receiver via the exhaust passage system.

The intake orifice of the entrance conduit may be laterally extended so as to be in spaced, overlapping alignment with the exhaust orifice of the exit conduit and may be provided with a centrifugally actuated, spring biased, slidable closure as hereinabove described. As the rate of rotation of a rotor, so equipped, increases, the slidable closure will be centrifugally actuated to move away from the intake orifice and thereby enlarge the flow-through dimension of this orifice. The enlargement of the orifice not only increases the operative volume thereof but also advances the time at which the fuel-air mixture enters the entrance conduit with respect to the position of the exit conduit. Conversely, as the rate of rotation of the rotor decreases, centripetal forces together with the biasing action of the spring, will actuate the slidable closure to move into the intake orifice and thereby reduce the flow-through dimension of this orifice.

As shown in FIG. 1A, the rotary engine of this invention can be used in a Diesel-type operation wherein air is admitted through the intake passage system and fuel is admitted directly into the combustion chamber through a fuel injector 118.

The rotor housing, an shown in FIG. 7, is provided with two pairs of intake 120a and discharge 120b conduits disposed in the non-combustion portion of the housing between the leading and trailing gates for admitting fluid into the rotor housing and discharging compressed fluid therefrom. The discharge conduits are provided with appropriate check valves. The conduits may be employed to compress air which can then be utilized in fuel combustion and/or in emission control. These passages may also be used for admitting and compressing fuel-air mixtures. With reference to FIG. 7, it should also be noted that each operating lobe is provided with intake and exhaust conduits 74a, 74b.

The rotary engine of this invention, as will be recognized by those of ordinary skill in the art, may be fabricated from any suitable material. Also, the rotary engine is oiled and cooled in accordance with means well known to those in the art. Although a single rotary engine has been illustrated and described, a plurality of rotary engines can be mounted to a common power shaft.

While in the foregoing description and accompanying drawing there has been shown and described and preferred embodiment of this invention, it will be understood, of course, that minor changes may be made in the details of construction as well as in the combination and arrangement of parts without departing from the spirit and scope of the invention as claimed.

That which is claimed is:

1. A rotary engine of the internal combustion type, comprising:

a rotor housing having an inner surface which defines a hollow, cylindrical chamber;

a rotor concentrically disposed within said cylindrical chamber;

said rotor having oppositely disposed sidewalls and a perimetrical cam surface which defines, in the direction of axial rotation, power lobe means, inlet pocket means, operating lobe means and combustion pocket means, with the transverse width of said cam surface being substantially equilevel;

said rotor being in slidable, sealable and rotatable engagement with the inner surface of said rotor housing except for said inlet and combustion pocket means which are in spaced relationship to said inner surface;

power transfer means secured to said rotor and extending beyond said housing;

a leading gate system and a trailing gate system, said leading and trailing gate systems being in correlative spaced relationship and, including, respectively, leading and trailing gate means and leading and trailing gate housings therefor, said leading and trailing gate housings being integrated with said rotor housing and in open mouth communication with the transverse width of the rotor cam surface, said leading and trailing gate means being yieldably, sealingly and slidably disposed within their respective housings and provided with substantially equilevel rotor engaging surfaces for sealingly slidably and fully engaging the substantially equilevel transverse width of the rotor cam surface, with the opposing lateral sidewalls of each of the leading and trailing gates being sealingly and slidably engageable with their laterally adjacent, inner surfaces of the rotor housing;

combustion chamber means recessed in the inner surface of said rotor housing between said leading and trailing gate means;

operative section means delimited by the leading and trailing gate means and the combustion chamber means disposed therebetween;

intake reservoir means defined by the portion of the rotor inlet pocket means in cyclic cooperation and communication with the operative section means;

expansion receiver means defined by the portion of the rotor combustion pocket means in cyclic cooperation and communication with the operative section means;

intake passage means for conveying fluid to the intake reservoir means and exhaust passage means for withdrawing fluid from the expansion receiver means;

said intake and exhaust passage means being disposed in spaced relationship to provide sequential and substantially mutually exclusive fluid flow systems;

said intake passage means comprising: (a) intake port means disposed in the rotor housing within the minimum radius defined by the rotor pocket means and (b) entrance conduit means in the rotor for extending fluid communication from the intake port means to the intake reservoir means;

said exhaust passage means comprising: (a) exhaust port means disposed in the rotor housing within the minimum radius defined by the rotor pocket means and (b) exit conduit means in the rotor for extending fluid communication from the expansion receiver means to the exhaust port means; and means for initiating combustion of combustible fluid in said combustion chamber means.

2. An engine according to claim 1 wherein a first, rotor directed, yieldable biasing means is disposed in the leading gate housing in cooperative engagement with the leading gate means for biasing the leading gate means against the rotor and a second, rotor directed, yieldable biasing means is disposed in the trailing gate housing in cooperative engagement with the trailing gate means for biasing the trailing gate means against the rotor.

3. An engine according to claim 2 wherein the first biasing means is a leading gate spring having one end secured to the leading gate means and the other end secured to the leading gate housing and the second biasing means is a trailing gate spring having one end secured to the trailing gate means and the other end secured to the trailing gate housing.

4. An engine according to claim 3 wherein each of the leading and trailing gate means extends, bilaterally, beyond the transverse width of the rotor cam surface and each of said gate means is provided with a pair of oppositely extending flanges which overlie a portion of the rotor side walls adjacent to the rotor cam surface, and the inner surface of said rotor housing is provided with mating slots for slidably and sealingly receiving said flanges.

5. An engine according to claim 4 which includes releasable locking means for radially securing said trailing gate means to said rotor during combustion while permitting axial rotation of said rotor.

6. An engine according to claim 5 wherein the releasable locking means comprise a pair of cooperating pin and groove assemblies, with the pins being resiliently secured to the inner walls of the oppositely disposed flanges of the trailing gate means and biased towards the opposing rotor side walls, and said grooves being arcuately disposed in the opposing rotor side walls for lockingly engaging said pins during combustion, and each of said grooves having a trailing end terminating in a cam contour to the surface of the adjoining rotor side wall.

7. An engine according to claim 1 wherein the entrance and exit conduit means comprise sidewall surface channels in the rotor.

8. An engine according to claim 1 wherein the entrance and exit conduit means extend internally through the rotor.

9. An engine according to claim 1 wherein said entrance conduit means extends internally through the rotor and said exit conduit means comprises a sidewall surface channel in the rotor.

10. An engine according to claim 1 wherein said exit conduit means extends internally through the rotor and said entrance conduit means comprises a sidewall surface channel in the rotor.

11. An engine according to claim 1 wherein the oppositely disposed rotor sidewalls comprise first and second sidewalls with the entrance conduit means being disposed in the surface of the first sidewall and the exit conduit means being disposed in the surface of the second sidewall and the intake port means being disposed in the rotor housing adjacent to the first sidewall and the exhaust port means being disposed in the rotor housing adjacent to the second sidewall.

12. An engine according to claim 1 wherein the operating lobe has an outer perimetrical wall of maximum radius which terminates at its end in depending anterior and posterior perimetrical walls of declining radius and said entrance and exit conduit means have orifice means disposed in said outer perimetrical wall for communicating with said intake reservoir and expansion receiver means, respectively.

13. An engine according to claim 1 wherein the operating lobe has an outer perimetrical wall of maximum radius which terminates at its ends in depending anterior and posterior perimetrical walls of declining radius and said entrance conduit means has orifice means disposed in the posterior perimetrical wall for communicating with said intake receiver means and said exit conduit means has orifice means disposed in the anterior perimetrical wall for communicating with said expansion receiver means.

14. An engine according to claim 1 wherein the rotor housing is provided with first and second, correlative, external conduits for admitting fluid into the rotor housing and discharging compressed fluid therefrom, said conduits being disposed in the non-combustion portion of the rotor housing between the leading and trailing gate means.

15. An engine according to claim 1 wherein said intake passage means is in cooperative communication with a fuel/air mixing source for admitting a fuel/air mixture into the rotor entrance means.

16. An engine according to claim 1 wherein said intake passage means is adapted for admitting air into the rotor entrance means and fuel injecting means are provided for admitting fuel directly into the combustion chamber means.

17. An engine according to claim 1 having a plurality of operative section means and cooperating intake and exhaust port means therefor.

18. An engine according to claim 17 wherein the plurality of operative section means are in spaced relationship.

19. An engine according to claim 17 wherein the plurality of operative section means are in abutting relationship with the leading gate means of a first operative section means forming the trailing gate means of the immediately succeeding operative section means and the trailing gate of said first operative section means forming the leading gate of the immediately preceding operative section means.

20. An engine according to claim 1 which includes multiple power and operating lobes and corresponding inlet and combustion pockets.

21. An engine according to claim 1 wherein the entrance conduit means is provided with intake orifice means for communicating with the intake ports means and the exit conduit means is provided with exhaust orifice means for communicating with the exhaust port means, said intake orifice means and said exhaust orifice means being in spaced, overlapping alignment, and at least one of said orifice means is provided with speed responsive, variable closure means for selectively varying the flow-through dimension of such orifice and for selectively varying the alignment of such orifice with respect to the other orifice.

22. An engine according to claim 21 wherein the speed responsive, variable closure means is a centrifugally actuated slidable closure.

23. An engine according to claim 1 wherein the leading gate means is in spaced relationship to the combustion chamber means and said engine includes means for withdrawing fluid compressibly entrapped between the power lobe means and the leading gate means.

24. An engine according to claim 23 wherein the trailing gate means is in spaced relationship to said combustion chamber means.

25. An engine according to claim 23 wherein the trailing gate means is in abutting relationship to said combustion chamber means.

26. An engine according to claim 23 wherein the means for withdrawing fluid compressibly entrapped between the power lobe means and the leading gate means is a groove disposed within and bridging the anterior corner of the power lobe.

27. An engine according to claim 23 wherein the means for withdrawing fluid compressibly entrapped between the power lobe means and the leading gate means is a conduit in the inner surface of the rotor housing for extending communication from the leading gate means to the combustion chamber means.

28. An engine according to claim 1 wherein the leading gate means is in abutting relationship to the combustion chamber means.

29. An engine according to claim 28 wherein the trailing gate means is in abutting relationship to the combustion chamber means.

30. An engine according to claim 28 wherein the trailing gate means is in spaced relationship to the combustion chamber means.

* * * * *